US012809218B2

(12) United States Patent
Deng et al.

(10) Patent No.: US 12,809,218 B2
(45) Date of Patent: Nov. 24, 2026

(54) DISPLAY PANEL AND MANUFACTURING METHOD THEREOF AS WELL AS DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Yin Deng, Beijing (CN); Changyi Wang, Beijing (CN); Xiaofeng Yin, Beijing (CN); Yaxing Liang, Beijing (CN); Junlang Tan, Beijing (CN)

(73) Assignees: CHENGDU BOE OPTOELECTRONICS TECHNOLOGY CO., LTD., Chengdu (CN); Beijing BOE Technology Development Co., Ltd., Beijing (CN)

( * ) Notice: Subject to any disclaimer, the term of this patent is extended or adjusted under 35 U.S.C. 154(b) by 248 days.

(21) Appl. No.: 18/712,056

(22) PCT Filed: Aug. 31, 2023

(86) PCT No.: PCT/CN2023/116133
§ 371 (c)(1),
(2) Date: May 21, 2024

(87) PCT Pub. No.: WO2025/043602
PCT Pub. Date: Mar. 6, 2025

(65) Prior Publication Data

US 2026/0140416 A1 May 21, 2026

(51) Int. Cl.
*G02F 1/1362* (2006.01)
*G02F 1/1333* (2006.01)

(52) U.S. Cl.
CPC .. *G02F 1/136286* (2013.01); *G02F 1/133388* (2021.01)

(58) Field of Classification Search
None
See application file for complete search history.

(56) References Cited

U.S. PATENT DOCUMENTS

2020/0273885 A1 8/2020 Feng et al.

FOREIGN PATENT DOCUMENTS

CN 109116644 A * 1/2019 ....... G02F 1/136286
CN 109659327 A 4/2019

(Continued)

OTHER PUBLICATIONS

Summary of Examiner's Telephone Comments of Chinese Patent Application No. 202380010400.8; (Foreign text, 1 page, English Translation thereof, 2 pages).

*Primary Examiner* — Phu Vu
(74) *Attorney, Agent, or Firm* — Myers Bigel, P.A.

(57) ABSTRACT

This disclosure provides a display panel and a manufacturing method thereof as well as a display device. The display panel comprises a substrate as well as a first area and a second area located on the substrate. The display panel further comprises a plurality of pixels, wherein the first area comprises a plurality of first gate lines, the second area comprises a plurality of second gate lines, the number of pixels connected by the first gate line is smaller than the number of pixels connected by the second gate line, the first gate line comprises a first part arranged in an active area and a second part arranged in a non-display area outside the active area, the first part and the second part are electrically connected with each other. The display panel further comprises a compensation structure. The compensation structure comprises a first electrode plate. Orthographic projections of (Continued)

the first electrode plate and the second part on the substrate at least partially overlap.

20 Claims, 9 Drawing Sheets

(56) References Cited

FOREIGN PATENT DOCUMENTS

| | | | | | |
|---|---|---|---|---|---|
| CN | 110596987 | A | | 12/2019 | |
| CN | 111108432 | A | | 5/2020 | |
| CN | 113885264 | A | | 1/2022 | |
| CN | 114974119 | A | | 8/2022 | |
| KR | 10-2022-0095833 | A | | 7/2022 | |
| KR | 20220095833 | A | * | 7/2022 | ......... H01L 27/3276 |
| WO | 2019/153299 | A1 | | 8/2019 | |
| WO | 2021243875 | A1 | | 12/2021 | |

* cited by examiner

DISPLAY PANEL AND MANUFACTURING METHOD THEREOF AS WELL AS DISPLAY DEVICE

RELATED APPLICATIONS

The present application is a 35 U.S.C. 371 national stage application of PCT International Application No. PCT/CN2023/116133, filed on Aug. 31, 2023, the entire disclosure of which is incorporated herein by reference.

TECHNICAL FIELD

This disclosure relates to the field of display technology, particularly, to a display panel and a manufacturing method thereof as well as a display device comprising the display panel.

BACKGROUND

With the development of science and technology, there is an increasing number of customized designs for display screens with irregular shapes. In panels with irregular display areas, the number of pixels per row in the irregular area is significantly reduced compared to the normal area, resulting in a large load difference between the normal and irregular areas, or a large load difference between adjacent pixel rows, which can cause poor display problems.

For display screens with irregular areas such as "bangs", the pixels in the "bangs" area are fewer than those in the normal area, and the load difference is large, which can cause display abnormalities.

SUMMARY

With respect to the above issues, this disclosure proposes a display panel and a manufacturing method thereof, as well as a display device comprising the display panel.

An embodiment of this disclosure provides a display panel. The display panel comprises a substrate as well as a first area and a second area located on the substrate. The display panel further comprises a plurality of pixels, wherein the first area comprises a plurality of first gate lines, the second area comprises a plurality of second gate lines, the number of pixels connected by the first gate line is smaller than the number of pixels connected by the second gate line, the 30 first gate line comprises a first part arranged in an active area and a second part arranged in a non-display area outside the active area, the first part and the second part are electrically connected with each other. The display panel further comprises a compensation structure. The compensation structure comprises a first electrode plate. Orthographic projections of the first electrode plate and the second part on the substrate at least partially overlap.

According to an embodiment of this disclosure, the display panel comprises a gate line layer, a first insulation layer, a source drain layer, a second insulation layer and a conductive layer that are sequentially stacked. The first part is arranged in the gate line layer, and the second part is arranged in the source drain layer.

According to an embodiment of this disclosure, the first gate line further comprises a third part arranged in the conductive layer. The third part is connected to the first part arranged in the gate line layer via a through hole passing through the second insulation layer and the first insulation layer, and the third part is connected to the second part arranged in the source drain layer via a through hole passing through the second insulation layer.

According to an embodiment of this disclosure, the compensation structure comprises a first outer ring electrode arranged in the conductive layer. The first outer ring electrode is arranged in the non-display area outside the active area of the display panel. The first electrode plate comprises the first outer ring electrode, and orthographic projections of the first outer ring electrode and the second part arranged in the source drain layer on the substrate at least partially overlap. The first outer ring electrode and the third part arranged in the conductive layer are disconnected from each other, and the first outer ring electrode and the electrode in the conductive layer in the active area are disconnected from each other.

According to an embodiment of this disclosure, the compensation structure further comprises a second outer ring electrode arranged in the gate line layer. The second outer ring electrode is arranged in the non-display area outside the active area of the display panel, and orthographic projections of the second outer ring electrode and the second part arranged in the source drain layer on the substrate at least partially overlap. The second outer ring electrode is connected to the first outer ring electrode via a through hole passing through the second insulation layer and the first insulation layer.

According to an embodiment of this disclosure, the compensation structure further comprises a first compensation unit arranged in the source drain layer, and the second part arranged in the source drain layer is a gate line fan-out line. The first compensation unit is formed between two adjacent gate line fan-out lines, and is connected with one of the gate line fan-out lines. Orthographic projections of the first outer ring electrode and the first compensation unit on the substrate at least partially overlap.

According to an embodiment of this disclosure, the compensation structure further comprises a third outer ring electrode arranged in the gate line layer. The third outer ring electrode is arranged in the non-display area outside the active area of the display panel. Orthographic projections of the third outer ring electrode and the first compensation unit on the substrate at least partially overlap, and the third outer ring electrode is connected to the first outer ring electrode via a through hole passing through the second insulation layer and the first insulation layer.

According to an embodiment of this disclosure, the first compensation unit and the third outer ring electrode both have a mesh shape, and orthographic projections of the third outer ring electrode and the first compensation unit on the substrate overlap.

According to an embodiment of this disclosure, the display panel further comprises a dummy cushion block. The dummy cushion block is arranged between adjacent second parts, and is arranged in the gate line layer and/or the source drain layer.

According to an embodiment of this disclosure, the display panel comprises a gate line layer, a first insulation layer, a source drain layer, a second insulation layer and a conductive layer that are sequentially stacked. The first gate lines and the second gate lines are formed in the gate line layer. The compensation structure comprises a second compensation unit. The second compensation unit is formed between two adjacent first gate lines, and is connected with one of the first gate lines.

According to an embodiment of this disclosure, the second compensation unit comprises a first sub compensation unit arranged in the gate line layer. The first sub compensation unit is connected to the first gate lines in the gate line layer, and orthographic projections of the first sub compensation unit and the conductive layer on the substrate at least partially overlap.

According to an embodiment of this disclosure, the first sub compensation unit comprises a plurality of first sub compensation units, and an overlapping area of orthographic projections of at least one first sub compensation unit of the plurality of first sub compensation units and the conductive layer on the substrate differs from an overlapping area of orthographic projections of other first sub compensation units of the plurality of first sub compensation units and the conductive layer on the substrate.

According to an embodiment of this disclosure, the second compensation unit further comprises a second sub compensation unit arranged in the source drain layer, and orthographic projections of the first sub compensation unit and the second sub compensation unit on the substrate at least partially overlap.

According to an embodiment of this disclosure, the first sub compensation unit comprises a plurality of first sub compensation units, the second sub compensation unit comprises a plurality of second sub compensation units, and an overlapping area of orthographic projections of at least one first sub compensation unit of the plurality of first sub compensation units and at least one second sub compensation unit of the 25 plurality of second sub compensation units differs from an overlapping area of orthographic projections of other first sub compensation units of the plurality of first sub compensation units and other second sub compensation units of the plurality of second sub compensation units on the substrate.

According to an embodiment of this disclosure, the second sub compensation unit is connected to the conductive layer via a through hole passing through the second insulation layer.

According to an embodiment of this disclosure, the first sub compensation unit comprises a plurality of first sub compensation units, and the first gate line comprises a plurality of first gate lines. The number of first sub compensation units connected by at least one gate line of the plurality of first gate lines differs from the number of first sub compensation units connected by other first gate lines of the plurality of first gate lines.

According to an embodiment of this disclosure, the display panel comprises a gate line layer, a first insulation layer, a source drain layer, a second insulation layer and a conductive layer that are sequentially stacked. The first gate lines and the second gate lines are formed in the gate line layer, and data lines are formed in the source drain layer. The compensation structure comprises a data line extension arranged in the source drain layer. The data line extension extends from the data line to the non-display area of the display panel, and orthographic projections of the data line extension and the second part arranged in the gate line layer on the substrate at least partially overlap.

According to an embodiment of this disclosure, a line width of the data line extension is greater than a line width of the data line.

An embodiment of this disclosure further provides a manufacturing method of a display panel for manufacturing a display panel according to each embodiment of this disclosure. The method comprises: preparing a compensation structure, the compensation structure comprises a first electrode plate, and orthographic projections of the first electrode plate and the second part on the substrate at least partially overlap.

An embodiment of this disclosure further provides a display device comprising a display panel according to each embodiment of this disclosure.

The display panel according to each embodiment of this disclosure, the capacitance on each gate line in an irregular area is compensated by arranging a compensation structure in the irregular area, so that the load on each gate line in the irregular area is basically the same as the load on each gate line in the normal area. While ensuring the display effect, it saves the display space of the display panel, which can ensure that the border of the display panel is narrower, and also can ensure that the display panel has a higher screen to body ratio.

DETAILED DESCRIPTION OF DRAWINGS

The accompanying drawings are used to provide further understanding of the embodiments of this disclosure and form a part of the specification for explaining this disclosure together with the embodiments of this disclosure and do not constitute limitation to this disclosure. By referring to the accompanying drawings to describe detailed exemplary embodiments, the above and other features and advantages will become more apparent to those skilled in the art, in the accompanying drawings:

FIG. 1 schematically shows a display panel including an irregular area;

EMBODIMENTS

In order to enable those skilled in the art to understand the technical solution of this disclosure better, the display panel and the manufacturing method thereof as well as the display device comprising the display panel provided by this disclosure will be described in detail below in conjunction with the accompanying drawings.

In the following text, the exemplary embodiments will be described more fully with reference to the accompanying drawings, but these exemplary embodiments may be embodied in different forms and should not be interpreted as limited to the embodiments described herein. On the contrary, the purpose of providing these embodiments is to make this disclosure thorough and complete, and to enable those skilled in the art to fully understand the scope of this disclosure.

Without conflict, the various embodiments and features in the embodiments of this disclosure can be combined with each other.

As used herein, the term "and/or" includes any and all combinations of at least one relevant enumeration entry.

The terms used herein are only intended to describe specific embodiments and are not intended to limit this disclosure. As used herein, singular forms "a", "an" and "the" are also intended to include plural forms, unless the context clearly indicates otherwise. It will also be understood that the terms "including" and/or "made of", when used in this specification, specify the presence of stated features, integers, steps, operations, elements and/or components, but do not preclude the presence or addition of at least one other features, integers, steps, operations, elements, components and/or groups thereof.

Unless otherwise specified, all terms used herein (including technical and scientific terms) have the same meanings as those commonly understood by those ordinary skilled in the art. It will also be understood that terms such as those limited in commonly used dictionaries should be interpreted as having meanings consistent with their respective meanings in the relevant technology and the context of this disclosure, and will not be interpreted as having idealized or overly formal meanings, unless explicitly specified herein.

Figure 1:
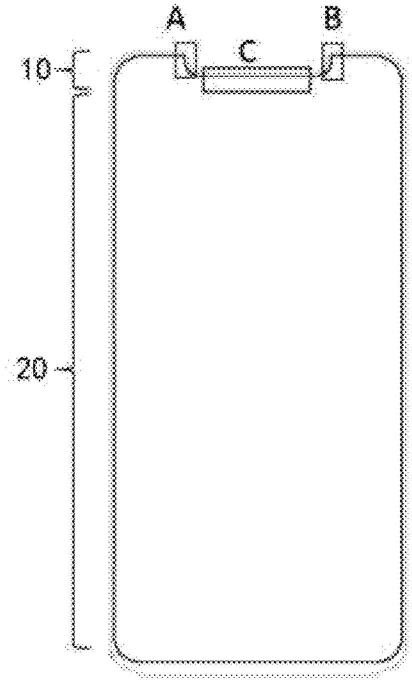

FIG. 1 schematically shows a display panel including an irregular area. Specifically, FIG. 1 shows a "bangs" screen (i.e., a display screen with irregular U-shaped grooves). In the "bangs" area (i.e., the position of the U-shaped groove), the length of the gate line will increase due to the influence of the U-shaped groove, resulting in an increase in resistance R. However, due to the absence of pixels in the "bangs" area, the overlap between the gate line and the data line is reduced, and the coupling capacitance C will be reduced. Therefore, the load R*C of each gate line in the "bangs" area will decrease. Of course, the display panel can include irregular areas of other shapes. It should be recognized that the U-shaped groove shown in FIG. 1 is only one embodiment, and the irregular area may also include blind holes formed in the display screen, with display pixels formed around the blind holes.

For mobile devices, the resolution of the display screen is higher, that is, the display screen has a higher pixel density unit (PPI), and it has touch and display driver integration (TDDI), so there are more rows of gate lines and shorter charging time for each row of gate lines. At the same time, the touch time needs to be subtracted to make the charging time for each row of gate lines shorter.

It is assumed that the load on each gate line in the irregular area is R1*C1, the load on each gate line in the normal area is R2*C2, and the voltage required for the highest grayscale is A V. When the R2*C2 in the normal area is too large, and the integrated circuit (IC) charges the normal area insufficiently or approaches a critical value, the charging time for each row of gate lines is t, and the maximum voltage that can be charged is B V, B<A. Therefore, after time t, the pixel voltage in the normal area cannot drive the liquid crystals to completely deflect, and the displayed grayscale is not the maximum grayscale. In the irregular area, however, due to the load R1*C1<R2*C2, the signal delay time is short. After time t, the pixels can be charged to the maximum voltage A V, which can reach the maximum grayscale. Visually, it can be clearly seen that the normal area has a darker image, while the irregular areas on both sides of the U-shaped groove have a brighter image, resulting in uneven display of the image.

Usually, load compensation is applied to the gate lines in the irregular area where the U-shaped groove is located. However, due to the requirement of narrow borders on display panels, the space available for load compensation is limited. The compensated load often cannot meet the requirements, and the difference between the compensated load and the normal area load is still significant, which may also lead to uneven image quality.

This disclosure aims to design a compensation structure to ensure that the delay time caused by the compensated load is close to the delay time in the normal area, while also achieving narrow borders and a higher screen to body ratio.

Referring to FIG. 1, an embodiment of this disclosure provides a display panel comprising a substrate (not shown), as well as a first area 10 (i.e., an irregular area) and a second area 20 (i.e., a normal area) located on the substrate, wherein the first area 10 comprises a plurality of first gate lines and the second area 20 comprises a plurality of second gate lines. Due to the presence of irregular areas, the number of pixels connected by the first gate line is smaller than the number of pixels connected by the second gate line. The display panel according to an embodiment of this disclosure comprises a compensation structure for compensating capacitance on each first gate line in the first area 10.

According to an embodiment of this disclosure, the capacitance on each first gate line in the first area 10 can be compensated at positions A, B, and/or C shown in FIG. 1, respectively.

Figure 2:
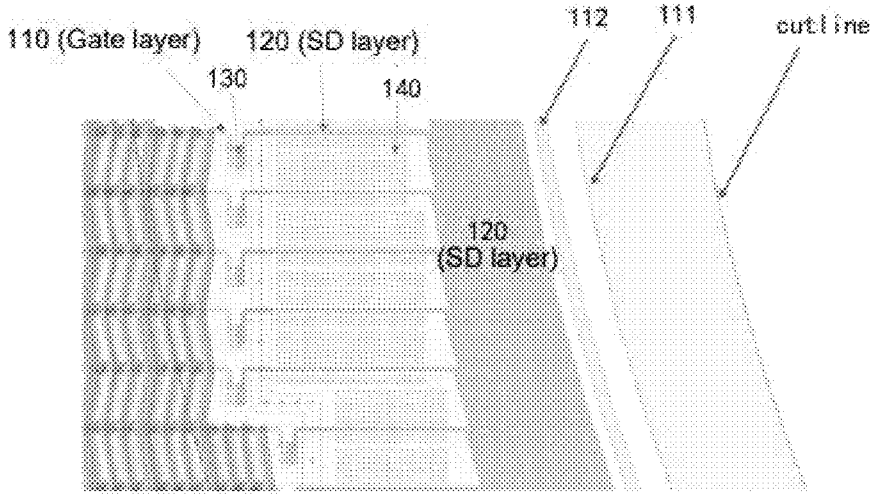
FIG. 2 shows a layout diagram of a display panel according to an embodiment of this disclosure.
Figure 3:
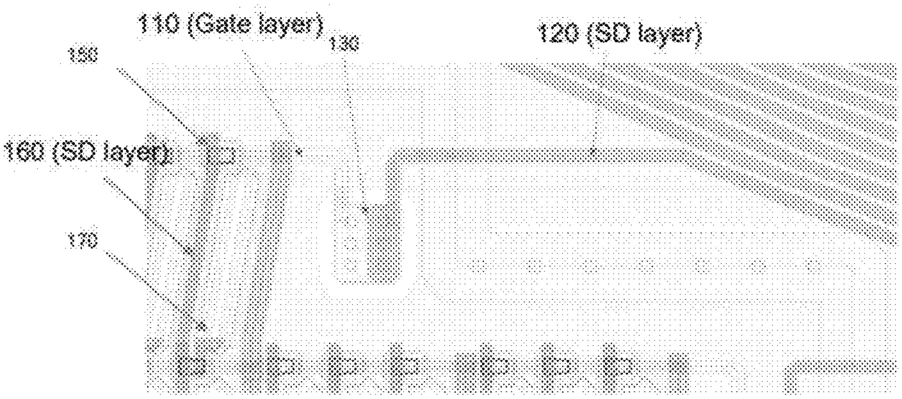
FIG. 3 shows a wiring diagram of a transfer unit in a display panel according to an embodiment of this disclosure.
Figure 4:
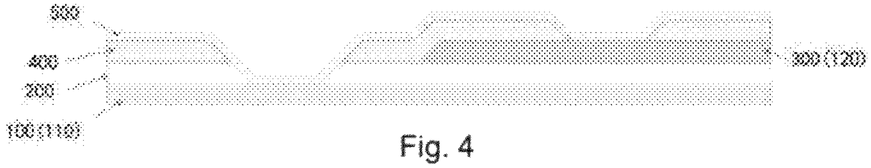
FIG. 4 shows a cross-sectional view of a display panel according to an embodiment of this disclosure.

FIG. 2 shows a layout diagram of a display panel near position A according to an embodiment of this disclosure. FIG. 3 shows a wiring diagram of a transfer unit in a display panel according to an embodiment of this disclosure. FIG. 4 shows a cross-sectional view of the transfer unit in a display panel according to an embodiment of this disclosure.

As shown in FIG. 2 and FIG. 3, the display panel may comprise a plurality of pixels. The first gate line comprises a first part 110 arranged in the active area (AA) and the second part 120 set in the non-display area outside the AA area. The first part 110 and the second part 120 are electrically connected to each other. The compensation structure of the display panel comprises a first electrode plate. Orthographic projections of the first electrode plate and the second part 120 of the first gate line on the substrate at least partially overlap.

The cutline of the display panel is shown FIG. 2, which includes the array substrate cutline and the color film substrate cutline. Upon making a display panel, a U-shaped groove for placing sensors (such as cameras) can be made by cutting off the substrate. Due to the brittleness of the dielectric layer (such as PVX), cracks are prone to occur during cutting, which can cause water vapor to enter the metal layer along the crack, leading to metal corrosion. To prevent occurrence of such situation, upon making display panels, the edge 111 of the dielectric layer will be shrunk inward, so that there is a certain distance between the edge 111 of the dielectric layer and the cutline, which is related to the cutting accuracy. In order to avoid the influence of the external environment of the display panel on the interior of the display panel, a ground wire (GND) 112 is also arranged within the cutline of the display panel. In some embodiments, the ground wire (GND) 112 is arranged at a side of the edge of the dielectric layer 111 away from the cutline of the display panel. In some embodiments, the ground wire (GND) 112 is arranged between the edge of the dielectric layer 111 and the second part 120 of the first gate line.

In some embodiments, the second part 120 of the first gate line is formed as a gate line fan-out line to be arranged around a U-shaped groove. The second portion 120 of the first gate line is formed in a non-display area outside the AA area, which is different from the first part 110 formed in the AA area, as there are no pixels directly connected to the second part 120. The first gate line further comprises a third part 130 (hereinafter referred to as a "transfer unit"), where each gate line fan-out line is connected to the first part 110 of the first gate line (i.e., the part connected to the pixel in the AA area) via each transfer unit.

As shown in FIG. 3, the first part 110 of the first gate line is connected to each pixel in the AA area through a Thin Film Transistor (TFT) 150. When the signal on the first gate line causes the TFT 150 to conduct, the data signal on the data line 160 is applied to the pixel electrode 170 through the TFT 150.

FIG. 4 shows a cross-sectional view of the transfer unit as shown in FIG. 3. As shown in FIG. 4, the display panel according to an embodiment of this disclosure comprises a gate line (Gate) layer 100, a gate insulation (GI) layer 200, a source drain (SD) layer 300, a dielectric (PVX) layer 400, and a conductive (ITO) layer 500 that are sequentially stacked. The first part 110 of the first gate line located in the Gate layer 100 can be transferred to the second part 120 of the first gate line arranged in the SD layer 300, that is, the first part 110 of the first gate line is arranged in the Gate layer 100, and the second part 120 of the first gate line (or gate line fan-out line) is arranged in the SD layer 300, thereby reducing the distance between the first gate line and the ITO layer 500.

Figure 5:
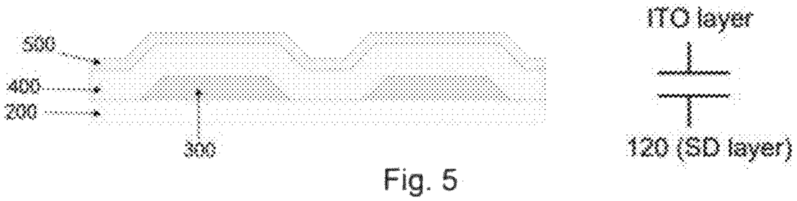
FIG. 5 shows a schematic diagram of forming overlapping capacitance in a display panel according to an embodiment of this disclosure.

Before the above transfer, upon forming an overlapping capacitance between the first gate line and the ITO layer 500, the dielectric layer between them includes the GI layer 200 and the PVX layer 400. FIG. 5 shows a cross-sectional view taken in a direction perpendicular to the gate line fan-out line (i.e., the second part 120 of the first gate line). Referring to FIG. 5, after the above transfer, the first gate line is transferred to the SD layer 300. When overlapping capacitance is formed between the first gate line and the ITO layer 500, the dielectric layer between them includes the PVX layer 400 and does not include the GI layer 200. That is, the distance between the first gate line and the ITO layer 500 decreases, resulting in an increase of the overlapping capacitance. That is, larger compensation is applied to the capacitance on each first gate line.

As shown in FIG. 4, the ITO layer 500 can be used to form a transfer unit (i.e., the third part 130 of the first gate line), which is connected to the first part 110 of the first gate line located at the Gate layer 100 via a through hole passing through the PVX layer 400 and the GI layer 200, and to the gate line fan-out line located at the SD layer (i.e., the second part 120 of the first gate line) via a through hole passing through the PVX layer 400, so as to transfer the first part 110 of the first gate line located at the Gate layer to the gate line fan-out line in the SD layer (i.e., the second part 120 of the first gate line). The transfer unit (i.e., the third part 130 of the first gate line) can be formed near positions A and B as shown in FIG. 1.

A compensation structure is provided in the display panel according to the embodiment of this disclosure, and the transfer unit is used to transfer the gate line arranged in the Gate layer 100 to the gate line fan-out line arranged in the SD layer 300, so as to reduce the distance between the gate line (or the gate line fan-out line) and the ITO layer 500, thereby increasing the overlapping capacitance and compensating for the capacitance on each gate line.

At positions A and B in the U-shaped groove area shown in FIG. 1, the gate line width is relatively smaller due to the narrow border. Compared to the normal area, the length of the gate line is longer, so the resistance on the gate line is usually equal to or greater than that on the gate line in the normal area. Therefore, there is usually no need to compensate for the resistance on the gate line in the irregular area. As shown in FIG. 2, at positions on both sides of the U-shaped groove area (i.e., positions A and B as shown in FIG. 1), the gate line located in the Gate layer 100 is transferred to the gate line fan-out line of the SD layer 300. The ITO layer 500 forms overlapping capacitance with all gate line fan-out lines formed in the SD layer 300, and the capacitance compensation value of each gate line is related to the length of the gate line fan-outline. In the irregular area, the longer the length of the gate line fan-out line means that the number of pixels corresponding to the gate line decreases, so the capacitance that needs to be compensated increases. On the other hand, the longer the length of the gate line fan-out line also means that the overlapping area with the ITO layer 500 increases, thereby increasing the capacitance compensation value that can be obtained. Therefore, there is no need to specifically calculate the compensation capacitance corresponding to each gate line.

Referring to FIG. 2, dummy cushion blocks 140 can be arranged between adjacent gate line fan-out lines to reduce the segment difference at the gate line fan-out line and improve flatness to ensure uniform box thickness. The dummy cushion blocks 140 can be arranged at the Gate layer 100 and/or the SD layer 300.

Figure 6:
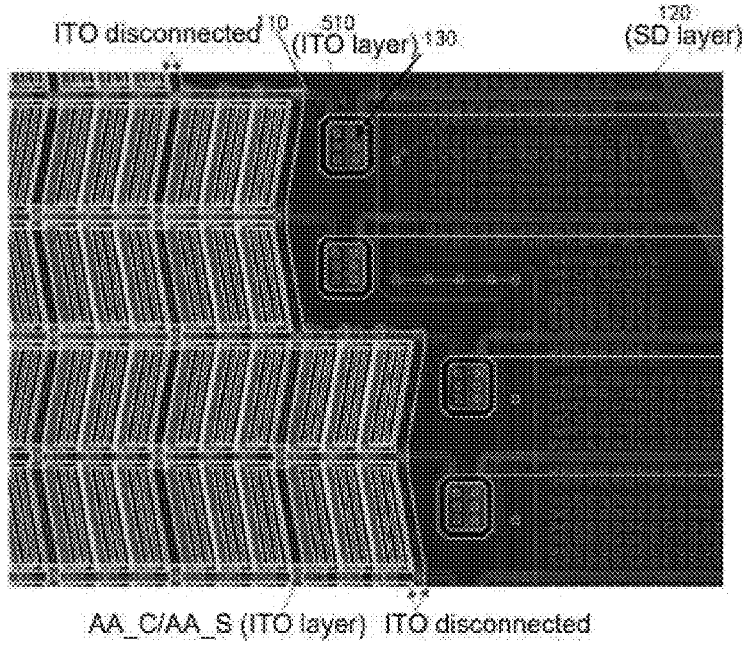
FIG. 6 shows a schematic diagram of forming a transfer unit in a conductive layer in a display panel according to an embodiment of this disclosure.

FIG. 6 shows a schematic diagram of forming a transfer unit (i.e., the third part 130 of the first gate line) in the ITO layer 500 in a display panel according to an embodiment of this disclosure.

Referring to FIG. 6, the ITO layer 500 can be used to form a transfer unit, and the material used to form the transfer unit is separated from other materials in the ITO layer 500. As shown in FIG. 6, the ITO layer 500 can form a common (COM) electrode (AA_C) and/or a Sensor electrode (AA_S) in the AA area of the display panel, and form a first outer ring electrode 510 in the non-display area outside the AA area.

According to an embodiment of this disclosure, the first electrode plate of the compensation structure can include the first outer ring electrode 510 in the ITO layer 500.

In the context of this disclosure, the "outer ring electrode" refers to an electrode formed in a non-display area outside the AA area, relative to the COM or Sensor electrode located in the inner ring formed in the AA area. As shown in FIG. 6, the material of the ITO layer 500 located in the AA area and the material of the ITO layer 500 in the non-display area outside the AA area are disconnected from each other, and the distance of the disconnection depends on the process exposure ability of the ITO layer 500. The material of the ITO layer used to form the transfer unit is located in the non-display area outside the AA area, and the formed transfer unit (i.e., the third part 130 of the first gate line) is separated from the first outer ring electrode 510. That is to say, the first outer ring electrode 510 is mutually independent of the COM or Sensor electrode (AA_C/AA_S), and the first outer ring electrode 510 is also mutually independent of the transfer unit.

Figure 7:
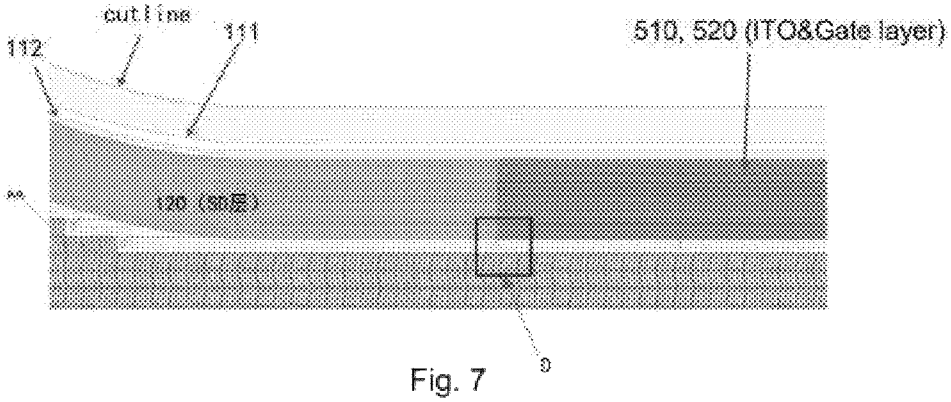
FIG. 7 shows another layout diagram of a display panel according to an embodiment of this disclosure.

FIG. 7 shows a layout diagram of a display panel near position C according to an embodiment of this disclosure.

As shown in FIG. 7, the compensation structure can also include a second outer ring electrode 520 formed in the Gate layer 100. After the gate line is transferred from the Gate layer 100 to the gate line fan-out line at the SD layer 300, the second outer ring electrode 520 can be formed at the Gate layer 100, forming overlapping capacitance with the gate line fan-out line formed at the SD layer 300 to further compensate for the capacitance on the first gate line.

Figure 8:
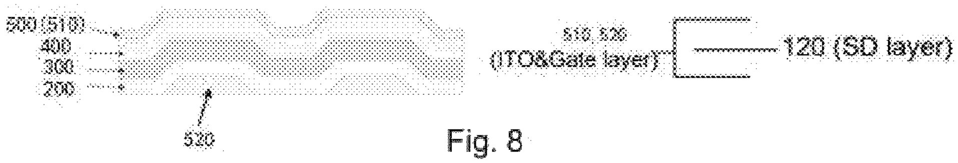
FIG. 8 shows another schematic diagram of forming overlapping capacitance in a display panel according to an embodiment of this disclosure.

FIG. 8 shows a schematic diagram of forming overlapping capacitance in the display panel as shown in FIG. 7.

As shown in FIG. 8, an overlapping capacitance is formed between the gate line fan-out line formed in the SD layer 300 and the ITO layer 500, the dielectric layer between them includes a PVX layer 400. In addition, an overlapping capacitance is formed between the gate line fan-out line formed in the SD layer 300 and the second outer ring electrode 520 formed in the Gate layer 100, the dielectric layer between them includes the GI layer 200, which further compensates for the capacitance on each first gate line, increasing the capacitance on the first gate line.

Figure 9:
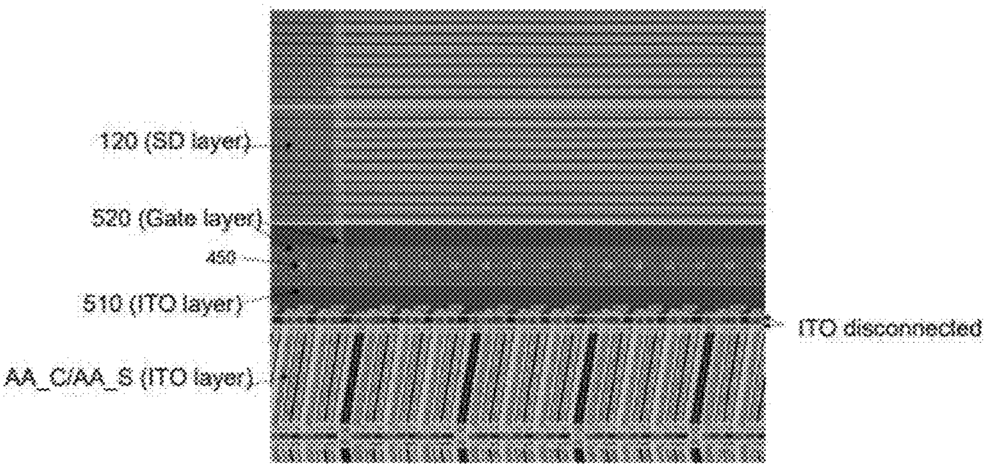
FIG. 9 shows a schematic diagram of forming an outer ring electrode in a gate layer of a display panel according to an embodiment of this disclosure.

FIG. 9 shows a schematic diagram of forming a second outer ring electrode 520 in the Gate layer 100 in a display panel according to an embodiment of this disclosure. Specifically, FIG. 9 shows a layout design at position D shown in FIG. 7.

As shown in FIG. 9, the second outer ring electrode 520 formed in the Gate layer 100 can be connected to the first outer ring electrode 510 (see FIG. 6) formed in the ITO layer 500 through a PVX hole 450. In addition, FIG. 9 shows that the second outer ring electrode 520 formed in the Gate layer 100 overlaps with the gate line fan-out line (i.e., the second part 120 of the first gate line) formed in the SD layer 300. It should be noted that this layout design needs to ensure the overlay between the SD layer 300 and the Gate layer 100. However, the second outer ring electrode 520 formed in the Gate layer 100 is not limited to the forming method shown in the figure, but can have different forming methods. For example, similar to the first outer ring electrode 510 formed in the ITO layer 500, the second outer ring electrode 520 in the Gate layer 100 can be formed as a whole.

It should be noted that the first outer ring electrode 510 formed in the ITO layer 500 is mutually independent of the COM or Sensor electrodes (AA_C/AA_S) in the AA area (i.e., disconnected and insulated from each other). However, in order to prevent display or touch problems caused by capacitive coupling due to different signals between the electrodes in the AA area and the first outer ring electrode 510, the signal of the first outer ring electrode 510 can be synchronized with the signal of the electrode in the AA area. That is, when the AA area is in the display state, the signals loaded to the electrodes in the AA area and the first outer ring electrode 510 are both COM signals; when the AA area is in the touch state, the signals loaded to the electrode in the AA area and the first outer ring electrode 510 are both touch pulse signals.

A compensation structure is provided in the display panel according to an embodiment of this disclosure, which includes a first outer ring electrode 510 formed in the ITO layer 500 and a second outer ring electrode 520 formed in the Gate layer 100. The transfer unit is used to transfer the gate line arranged in the Gate layer 100 to the gate line fan-out line arranged in the SD layer 300, so as to reduce the distance between the gate line (or gate line fan-out line) and the ITO layer 500. After transferring the gate line of the Gate layer 100 to the gate line fan-out line of the SD layer 300 through a transfer unit, a double-layer capacitance can be formed by the second outer ring electrode 520 formed in the Gate layer 100, making it easier for the compensation capacitance to meet the requirements, and the design is simple and easy to operate.

Figure 10:
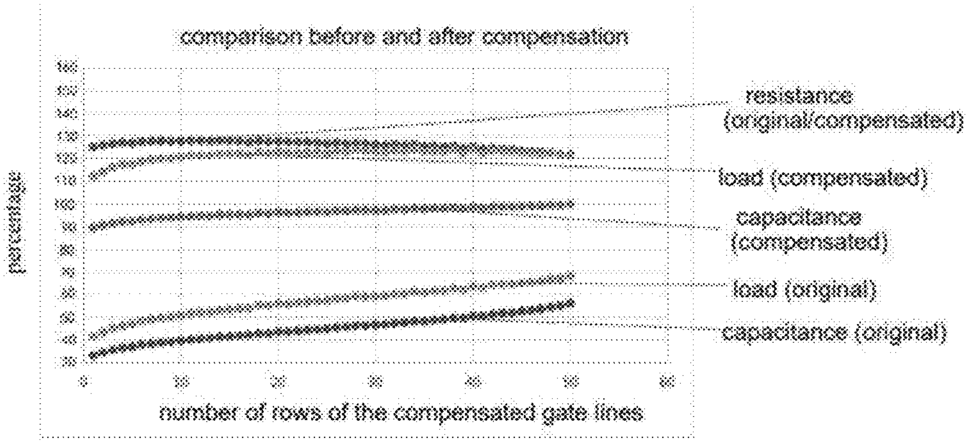
FIG. 10 shows a schematic diagram of the comparison before and after compensation of a display panel according to an embodiment of this disclosure.

FIG. 10 shows a schematic diagram of the comparison before and after compensation of a display panel according to an embodiment of this disclosure.

Referring to FIG. 10, where the vertical axis represents the percentage before and after compensation, and the horizontal axis represents the number of rows of compensated gate lines in the irregular area. Before compensation, the capacitance at the U-shaped groove position is 30% to 50% of the capacitance at the normal position, the resistance at the U-shaped groove position is 120% to 130% of the resistance at the normal position, and the load R*C at the U-shaped groove position is 40% to 60% of the load R*C at the normal position. After compensation, the capacitance at the U-shaped groove position is 90% to 100% of the capacitance at the normal position, the resistance at the U-shaped groove position is the same as before compensation, and the load R*C at the U-shaped groove position is 110% to 130% of the load R*C at the normal position.

According to an embodiment of this disclosure, if the capacitance compensation on the gate line still cannot meet the requirements after compensation at position C, compensation can be achieved by increasing the gate line area at positions A and B.

Figure 11:
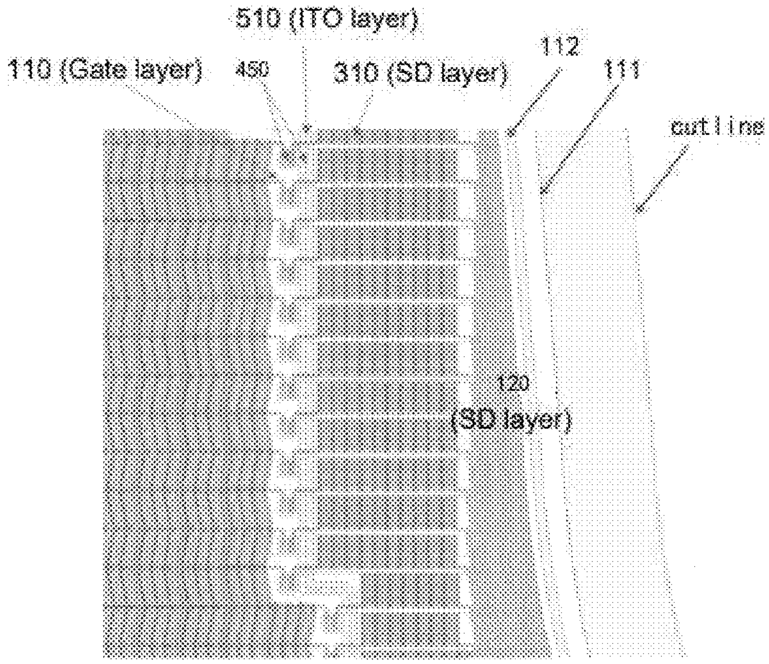
FIG. 11 shows another layout diagram of a display panel according to an embodiment of this disclosure.
Figure 12:
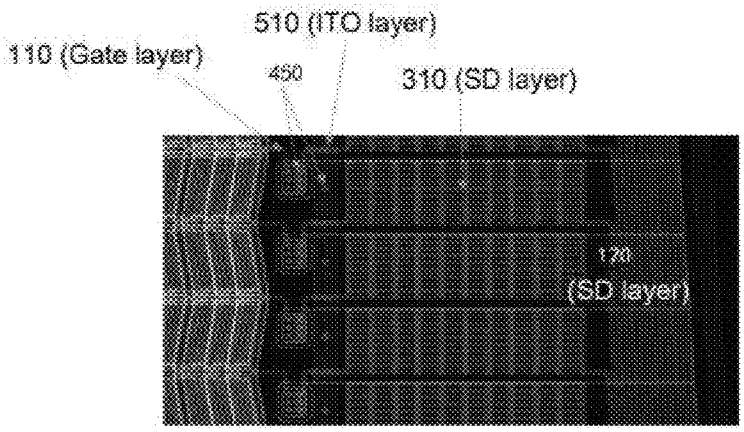
FIG. 12 shows a schematic diagram of forming a first compensation unit in a source drain layer of a display panel according to an embodiment of this disclosure.

FIG. 11 shows another layout diagram of a display panel near position A according to an embodiment of this disclosure. FIG. 12 shows a schematic diagram of forming a first compensation unit 310 in the SD layer 300 in a display panel according to an embodiment of this disclosure.

According to an embodiment of this disclosure, the compensation structure can further comprise a first compensation unit 310 formed in the SD layer 300. Compared with the embodiment shown in FIG. 2, in the display panels shown in FIGS. 11 and 12, a first compensation unit 310 is formed between two adjacent gate line fan-out lines (i.e., the second part 120 of the first gate line), and the formed first compensation unit 310 is connected to one of the gate line fan-out lines. In the embodiment shown in FIG. 11, by adding a first compensation unit 310 connected to the gate line fan-out line, the overlapping area between the gate line fan-out line and the ITO layer 500 can be increased, thereby increasing the overlapping capacitance formed between the first gate line and the ITO layer, so as to compensate for the capacitance on the first gate line.

It should be recognized that although FIGS. 11 and 12 show that the first compensation unit 310 has a mesh shape, the shape of the first compensation unit 310 is not limited to the style shown in the figure, but can have various pattern styles. If the first compensation unit 310 is located at the sealant area, the pattern of the first compensation unit 310 needs to be able to ensure an appropriate opening rate so as to ensure that the sealant can be cured through sufficient ultraviolet (UV) light.

Figure 13:
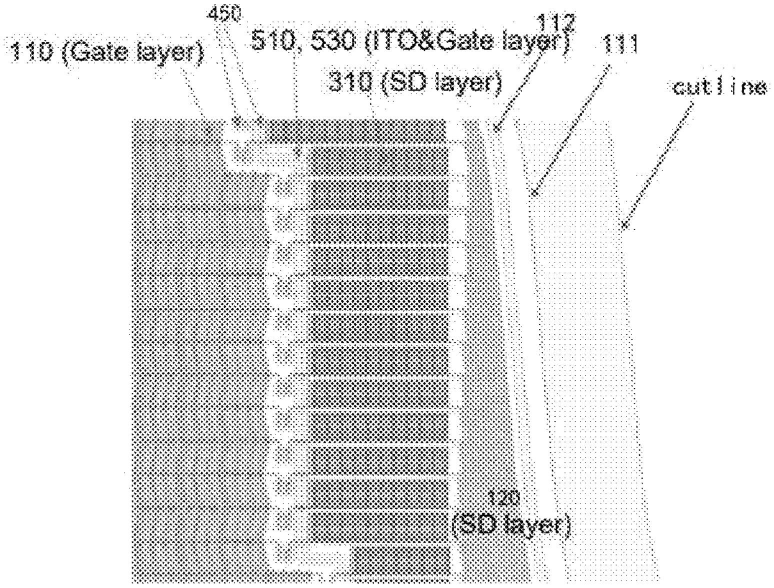
FIG. 13 shows another layout diagram of a display panel according to an embodiment of this disclosure.
Figure 14:
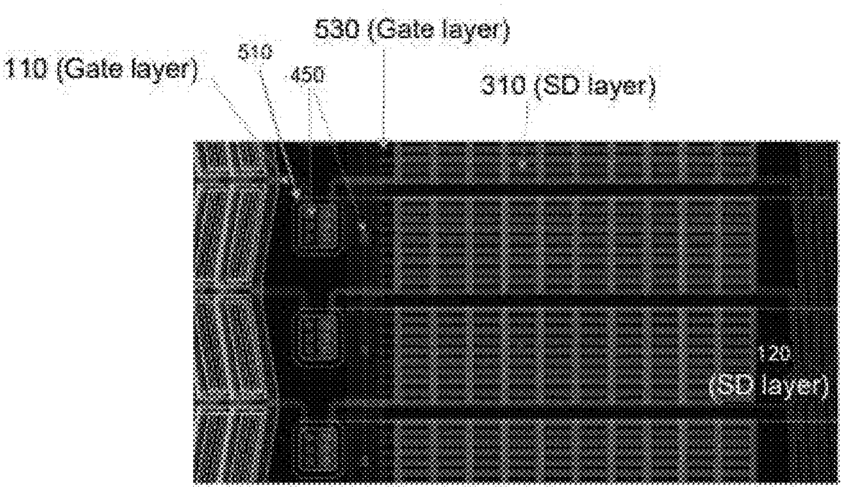
FIG. 14 shows a schematic diagram of forming a first compensation unit in a source drain layer and forming an outer ring electrode in a gate line layer of a display panel according to an embodiment of this disclosure.

FIG. 13 shows another layout diagram of a display panel near position A according to an embodiment of this disclosure. FIG. 14 shows a schematic diagram of forming a first compensation unit 310 in the SD layer 300 and forming the third outer ring electrode 530 in the Gate layer 100 of a display panel according to an embodiment of this disclosure.

According to an embodiment of this disclosure, the compensation structure may further include a third outer ring electrode 530 in the Gate layer 100 corresponding to the first compensation unit 310. Compared with the embodiments shown in FIGS. 11 and 12, in the display panel shown in FIGS. 13 and 14, a third outer ring electrode 530 is formed in the Gate layer 100 at the position corresponding to the first compensation unit 310 in the SD layer 300, and is connected to the first outer ring electrode 510 formed in the ITO layer 500 through the PVX hole 450. Therefore, not only an overlapping capacitance is formed between the gate line fan-out line in the SD layer 300 and the first outer ring electrode 510 formed in the ITO layer 500, but also an overlapping capacitance is formed between the gate line fan-out line in the SD layer 300 and the third outer ring electrode 530 in the Gate layer 100. Thus, by forming a third outer ring electrode 530 in the Gate layer 100 at the position corresponding to the first compensation unit 310, a double-layer capacitance can be formed to compensate for the capacitance on the first gate line.

Similar to the first compensation unit 310 described with reference to FIGS. 11 and 12, according to an embodiment of this disclosure, the specific pattern of the third outer ring electrode 530 formed in the Gate layer 100 is not limited, as long as an appropriate opening ratio can be ensured so as to ensure that sufficient UV light can be transmitted to cure the sealant.

The display panel according to the embodiments of this disclosure has been described above in conjunction with FIG. 2 to FIG. 14, i.e., by transferring the gate line located at the Gate layer 100 to the gate line fan-out line at the SD layer 300, the distance between the gate line and the ITO layer 500 can be reduced, thereby compensating for the capacitance on the gate line. However, the embodiments of this disclosure are not limited to this, the capacitance on the gate line can be compensated without transferring the gate line of the Gate layer to the SD layer.

Figure 15:
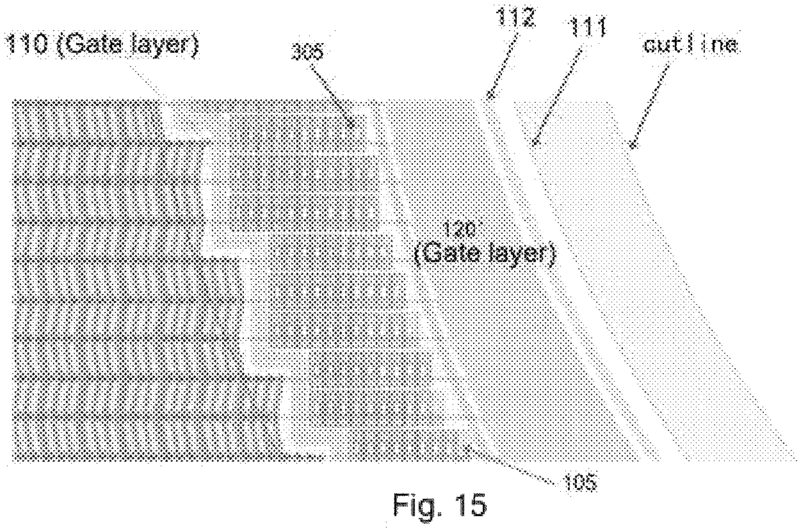
FIG. 15 shows another layout diagram of a display panel according to an embodiment of this disclosure.

FIG. 15 shows another layout diagram of a display panel near position A according to an embodiment of this disclosure. Compared with the embodiment shown in FIG. 2, in the display panel shown in FIG. 15, no transfer unit is formed, and the first part 110 of the first gate line and the second part 120' of the first gate line (i.e., the gate line fan-out line) are both formed in the Gate layer.

According to an embodiment of this disclosure, the compensation structure may include a second compensation unit. As shown in FIG. 15, a second compensation unit is formed between two adjacent first gate lines, and the formed second compensation unit is connected to one of the first gate lines.

According to the embodiment of this disclosure, the second compensation unit can comprise a first sub compensation unit 105 formed in the Gate layer, wherein the first sub compensation unit 105 is connected to the first gate line, and a capacitance is formed between the first sub compensation unit 105 and the ITO layer 500, so as to compensate for the capacitance on the first gate line.

According to the embodiment of this disclosure, the second compensation unit further comprises a second sub compensation unit 305 formed in the SD layer 300, and a capacitance is formed between the first sub compensation unit 105 and the second sub compensation unit 305, so as to compensate for the capacitance on the first gate line.

Figure 16A:
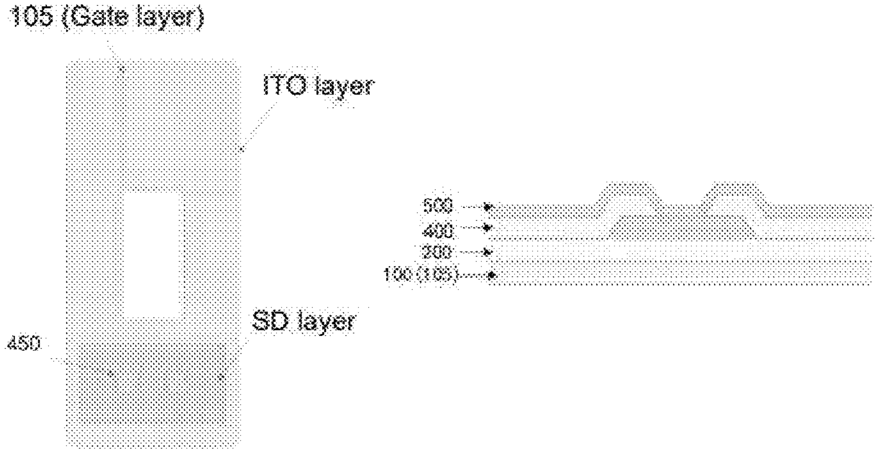
FIG. 16A and FIG. 16B show schematic diagrams of a second compensation unit in a display panel according to an embodiment of this disclosure.
Figure 16B:
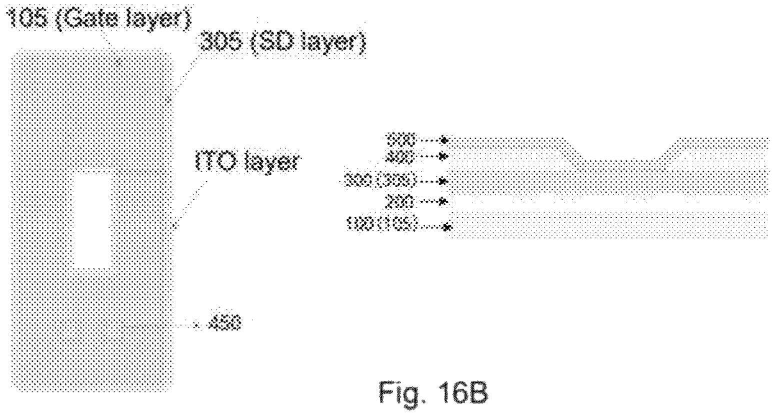

FIG. 16A and FIG. 16B show a schematic diagram of a second compensation unit in a display panel according to an embodiment of this disclosure.

Referring to FIG. 16A, a capacitance is formed between the first sub compensation unit 105 of the Gate layer 100 and the ITO layer 500, and the dielectric layer between them comprises a GI layer 200 and a PVX layer 400. The ITO layer 500 can be connected to the SD layer 300 through a PVX hole 450.

Referring to FIG. 16B, a capacitance is formed between the first sub compensation unit 105 of the Gate layer 100 and the second sub compensation unit 305 of the SD layer 300, and the dielectric layer between them comprises a GI layer 200. The second sub compensation unit 305 of the SD layer 300 can be connected to the ITO layer 500 through the PVX hole 450.

Due to the different thicknesses of the dielectric layers between them, in case of the same area, the compensation capacitances provided by the compensation unit shown in FIG. 16A and the compensation unit shown in FIG. 16B are different, and the compensation capacitance provided by the compensation unit shown in FIG. 16A is smaller than that provided by the compensation unit shown in FIG. 16B.

As shown in FIG. 15, for different first gate lines, different types of compensation units are arranged in order to ensure consistency in compensation, as the size of the space being able to be provided to the second compensation unit at position A or B is different, as shown in FIGS. 16A and 16B. If the space is large and the compensation is sufficient, more compensation units as shown in FIG. 16A can be arranged to compensate for the space. According to actual needs, the number of various compensation units can be reasonably arranged to obtain the desired compensation capacitance. In addition, the desired compensation capacitance can also be obtained by adjusting the area of the first sub compensation unit 105 and/or the second sub compensation unit 305, and/or by adjusting the thickness of the dielectric layer.

As shown in FIGS. 16A and 16B, in order to ensure an appropriate opening ratio so as to ensure that sufficient UV light can be transmitted to cure the sealant, holes can be provided in the first sub compensation unit 105 and/or the second sub compensation unit 305.

A compensation structure is provided in the display panel according to the embodiment of this disclosure, which includes a second compensation unit. The second compensation unit comprises a first sub compensation unit 105 formed in the Gate layer 100 and/or a second sub compensation unit 305 formed in the SD layer 300. The desired compensation capacitance can be obtained by adjusting the number of first sub compensation units 105 and/or second sub compensation units 305, the area of first sub compensation units 105 and/or second sub compensation units 305, and the thickness of the dielectric layer to provide different compensation capacitance for different first gate lines, so that the compensated load (i.e., the product of compensated capacitance and resistance) on each first gate line is consistent.

Figure 17:
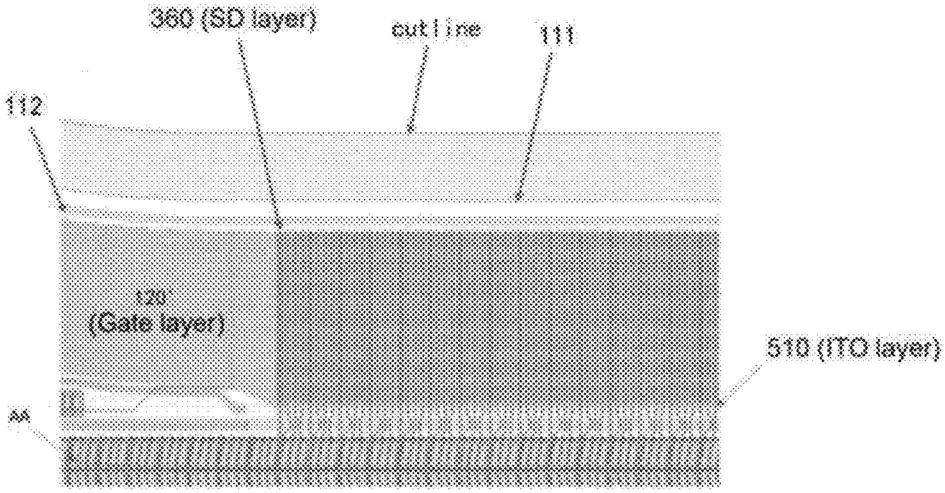
FIG. 17 shows another layout diagram of a display panel according to an embodiment of this disclosure.

FIG. 17 shows another layout diagram of a display panel near position C according to an embodiment of this disclosure.

According to the embodiment of this disclosure, the compensation structure can comprise a data line extension 360 formed in the SD layer 300. As shown in FIG. 17, at position C shown in FIG. 1, the data line arranged in the SD layer 300 can be extended outside the AA area to form a data line extension 360, so as to form an overlapping capacitance with the gate line fan-out line 120' formed in the Gate layer 100. The dielectric layer between them includes the GI layer (not shown in FIG. 17).

As shown in FIG. 17, the data line arranged in the SD layer 300 can include a touch data line and a display data line. Each touch data line and three display data lines between two adjacent touch data lines all extend outside the AA area to form the data line extension 360.

According to the embodiment of this disclosure, the line width of the data line extension 360 can be widened to increase the overlapping area. In some embodiments, the line width of each data line extension 360 is larger than that of the corresponding AA area data line, for example, the line width of the data line extension 360 formed by extending the touch data line outside the AA area is larger than that of the touch data line.

A compensation structure is provided in the display panel according to the embodiment of this disclosure, which includes a data line extension 360 formed in the SD layer 300. The capacitance on the first gate line can be compensated by forming an overlapping capacitance between the data line extension 360 and the gate line fan-out line 120' of the Gate layer 100. In addition, capacitance on the data line can also be compensated.

Figure 18:
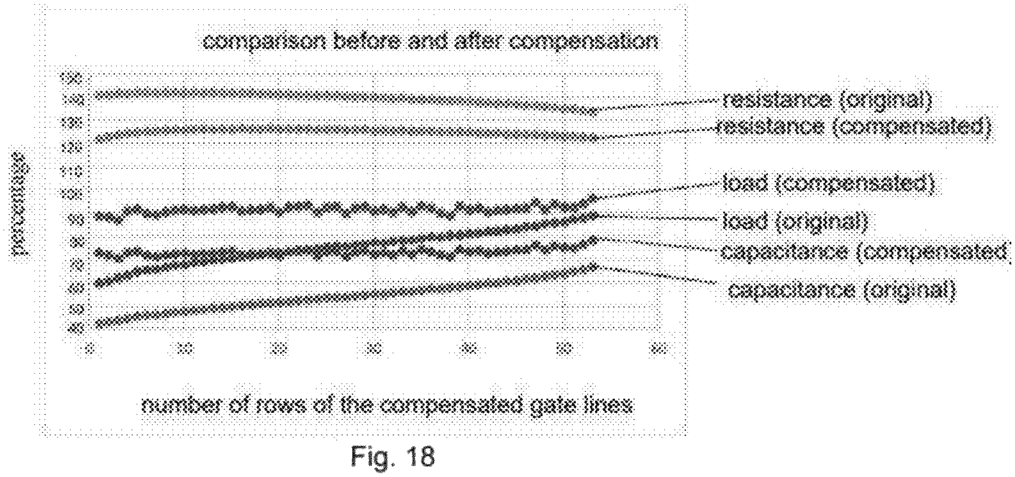
FIG. 18 shows a schematic diagram of the comparison before and after compensation of a display panel according to an embodiment of this disclosure.

FIG. 18 shows a schematic diagram of the comparison before and after compensation of a display panel according to an embodiment of this disclosure.

Referring to FIG. 18, where the vertical axis represents the percentage before and after compensation, and the horizontal axis represents the number of rows of compensated gate lines in the irregular area. Before compensation, the capacitance at the U-shaped groove position is 40% to 60% of the capacitance at the normal position, the resistance at the U-shaped groove position is 130% to 150% of the resistance at the normal position, and the load R*C at the U-shaped groove position is 60% to 90% of the load R*C at the normal position. After compensation, the capacitance at the U-shaped groove position is 70% to 80% of the capacitance at the normal position, the resistance at the U-shaped groove position is 120% to 130% of the resistance at the normal position, and the load R*C at the U-shaped groove position is 85% to 100% of the load R*C at the normal position.

It should be recognized that although FIG. 17 only shows the compensation structure that compensates for the capacitance on the first gate line at position C shown in FIG. 1, the ITO layer 500 can also be formed to fully cover the gate lines (or gate line fan-out lines) at positions A and B shown in FIG. 1 to increase the compensation capacitance.

An embodiment of this disclosure provides a manufacturing method of a display panel, wherein the display panel comprises a first area 10 (i.e., an irregular area) and a second area 20 (i.e., a normal area), the number of pixels corresponding to each gate line in the first area 10 is less than the number of pixels corresponding to each gate line in the second area 20.

Figure 19:
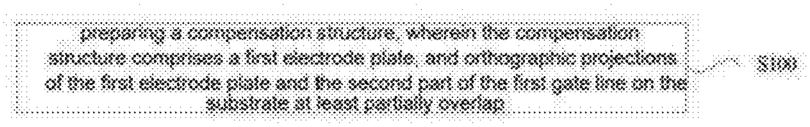
FIG. 19 shows a flow chart of a manufacturing method of a display panel according to an embodiment of this disclosure.

FIG. 19 shows a flow chart of a manufacturing method of a display panel according to an embodiment of this disclosure.

As shown in FIG. 19, the method comprises step S100. In step S100: preparing a compensation structure, the compensation structure comprises a first electrode plate, and orthographic projections of the first electrode plate and the second part on the substrate at least partially overlap.

According to an embodiment of this disclosure, the display panel comprises a Gate layer, a GI layer, a SD layer, a PVX layer and an ITO layer that are sequentially stacked. The manufacturing method further comprises: transferring the gate line located in the Gate layer to the SD layer.

According to an embodiment of this disclosure, transferring the gate line located in the Gate layer to the SD layer comprises: forming a transfer unit using the ITO layer so as to transfer the gate line located in the Gate layer to the gate line fan-out line in the SD layer.

According to an embodiment of this disclosure, the manufacturing method further comprises: arranging dummy cushion blocks between adjacent gate line fan-out lines, the dummy cushion blocks being arranged in the Gate layer and/or the SD layer.

According to an embodiment of this disclosure, the manufacturing method further comprises: forming an outer ring electrode in the Gate layer, wherein the outer ring electrode in the Gate layer forms an overlapping capacitance with the gate line fan-out line in the SD layer.

According to an embodiment of this disclosure, the manufacturing method further comprises: in the SD layer, forming a first compensation unit between two adjacent gate line fan-out lines, wherein the first compensation unit formed is connected to one of the gate line fan-out lines.

According to an embodiment of this disclosure, the manufacturing method further comprises: forming, at the position corresponding to the first compensation unit in the SD layer, an outer ring electrode in the Gate layer which is connected to the ITO layer through a PVX hole.

According to an embodiment of this disclosure, the manufacturing method further comprises: forming a second compensation unit between two adjacent gate lines, and the second compensation unit formed is connected to one of the gate lines.

According to an embodiment of this disclosure, forming a second compensation unit between two adjacent gate lines comprises: forming a first sub compensation unit in the Gate layer, wherein the first sub compensation unit is connected to the gate line and a capacitance is formed between the first sub compensation unit and the ITO layer.

According to an embodiment of this disclosure, forming a second compensation unit between two adjacent gate lines further comprises:

forming a second sub compensation unit in the SD layer, and forming a capacitance between the first sub compensation unit and the second sub compensation unit.

According to an embodiment of this disclosure, the manufacturing method further comprises: forming a data line extension in the SD layer, so as to form an overlapping capacitance with the gate line fan-out line in the Gate layer.

The display panel provided according to each embodiment of this disclosure can be manufactured by the manufacturing method of a display panel provided by the embodiment of this disclosure. Technical details may be referred to the various embodiments described in conjunction with FIGS. 2 to 18, which will not be repeated here.

Figure 20:
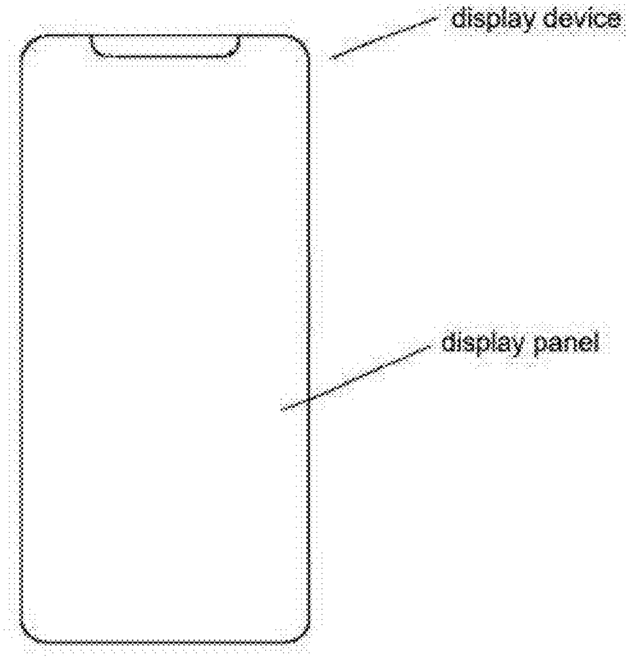
FIG. 20 shows a block diagram of a display device according to this disclosure.

FIG. 20 shows a block diagram of a display device according to this disclosure.

An embodiment of this disclosure provides a display device comprising a display panel according to each embodiment of this disclosure.

Exemplary embodiments have been disclosed herein, and although specific terms are used, they are only intended for and should only be interpreted as general explanatory meanings and are not intended for limiting purposes. In some embodiments, it is evident to those skilled in the art that unless otherwise explicitly stated, features, properties, and/or elements described in conjunction with specific embodiments may be used separately, or may be used in combination with features, properties, and/or elements described in conjunction with other embodiments. Therefore, those skilled in the art will understand that various changes in form and details may be made without departing from the scope of this disclosure as elucidated by the attached claims.

The invention claimed is:

1. A display panel, the display panel comprising a substrate as well as a first area and a second area located on the substrate, the display panel further comprising a plurality of pixels, wherein the first area comprises a plurality of first gate lines, the second area comprises a plurality of second gate lines, the number of pixels connected by the first gate line is smaller than the number of pixels connected by the second gate line, the first gate line comprises a first part arranged in an active area and a second part arranged in a non-display area outside the active area, the first part and the second part are electrically connected with each other, the display panel further comprising a compensation structure, wherein the compensation structure comprises a first electrode plate, and orthographic projections of the first electrode plate and the second part on the substrate at least partially overlap, wherein the display panel comprises a gate line layer, a first insulation layer, a source drain layer, a second insulation layer and a conductive layer that are sequentially stacked, the first part is arranged in the gate line layer, and the second part is arranged in the source drain layer.

2. The display panel according to claim 1, wherein the first gate line further comprises a third part arranged in the conductive layer, the third part is connected to the first part arranged in the gate line layer via a through hole passing through the second insulation layer and the first insulation layer, and the third part is connected to the second part arranged in the source drain layer via a through hole passing through the second insulation layer.

3. The display panel according to claim 2, wherein the compensation structure comprises a first outer ring electrode arranged in the conductive layer, the first outer ring electrode is arranged in the non-display area outside the active area of the display panel, the first electrode plate comprises the first outer ring electrode, and orthographic projections of the first outer ring electrode and the second part arranged in the source drain layer on the substrate at least partially overlap, the first outer ring electrode and the third part arranged in the conductive layer are disconnected from each other, and the first outer ring electrode and the electrode in the conductive layer in the active area are disconnected from each other.

4. The display panel according to claim 3, wherein the compensation structure further comprises a second outer ring electrode arranged in the gate line layer, the second outer ring electrode is arranged in the non-display area outside the active area of the display panel, and orthographic projections of the second outer ring electrode and the second part arranged in the source drain layer on the substrate at least partially overlap, the second outer ring electrode is connected to the first outer ring electrode via a through hole passing through the second insulation layer and the first insulation layer.

5. The display panel according to claim 3, wherein the compensation structure further comprises a first compensation unit arranged in the source drain layer, and the second part arranged in the source drain layer is a gate line fan-out line, the first compensation unit is formed between two adjacent gate line fan-out lines, and is connected with one of the gate line fan-out lines, orthographic projections of the first outer ring electrode and the first compensation unit on the substrate at least partially overlap.

6. The display panel according to claim 5, wherein the compensation structure further comprises a third outer ring electrode arranged in the gate line layer, the third outer ring electrode is arranged in the non-display area outside the active area of the display panel, orthographic projections of the third outer ring electrode and the first compensation unit on the substrate at least partially overlap, and the third outer ring electrode is connected to the first outer ring electrode via a through hole passing through the second insulation layer and the first insulation layer.

7. The display panel according to claim 6, wherein the first compensation unit and the third outer ring electrode both have a mesh shape, and orthographic projections of the third outer ring electrode and the first compensation unit on the substrate overlap.

8. The display panel according to claim 1, further comprising a dummy cushion block, the dummy cushion block being arranged between adjacent second parts, and being arranged in the gate line layer and/or the source drain layer.

9. A display panel, the display panel comprising a substrate as well as a first area and a second area located on the substrate, the display panel further comprising a plurality of pixels, wherein the first area comprises a plurality of first gate lines, the second area comprises a plurality of second gate lines, the number of pixels connected by the first gate line is smaller than the number of pixels connected by the second gate line, the first gate line comprises a first part arranged in an active area and a second part arranged in a non-display area outside the active area, the first part and the second part are electrically connected with each other, the display panel further comprising a compensation structure, wherein the compensation structure comprises a first electrode plate, and orthographic projections of the first electrode plate and the second part on the substrate at least partially overlap, wherein the display panel comprises a gate line layer, a first insulation layer, a source drain layer, a second insulation layer and a conductive layer that are sequentially stacked, the first gate lines and the second gate lines are formed in the gate line layer, the compensation structure comprises a second compensation unit, the second compensation unit is formed between two adjacent first gate lines, and is connected with one of the first gate lines.

10. The display panel according to claim 9, wherein the second compensation unit comprises a first sub compensation unit arranged in the gate line layer, the first sub compensation unit is connected to the first gate lines in the gate line layer, and orthographic projections of the first sub compensation unit and the conductive layer on the substrate at least partially overlap.

11. The display panel according to claim 10, wherein the first sub compensation unit comprises a plurality of first sub compensation units, and an overlapping area of orthographic projections of at least one first sub compensation unit of the plurality of first sub compensation units and the conductive layer on the substrate differs from an overlapping area of orthographic projections of other first sub compensation units of the plurality of first sub compensation units and the conductive layer on the substrate.

12. The display panel according to claim 10, wherein the second compensation unit further comprises a second sub compensation unit arranged in the source drain layer, and orthographic projections of the first sub compensation unit and the second sub compensation unit on the substrate at least partially overlap.

13. The display panel according to claim 12, wherein the first sub compensation unit comprises a plurality of first sub compensation units, the second sub compensation unit comprises a plurality of second sub compensation units, and an overlapping area of orthographic projections of at least one first sub compensation unit of the plurality of first sub compensation units and at least one second sub compensation unit of the plurality of second sub compensation units differs from an overlapping area of orthographic projections of other first sub compensation units of the plurality of first sub compensation units and other second sub compensation units of the plurality of second sub compensation units on the substrate.

14. The display panel according to claim 12, wherein the second sub compensation unit is connected to the conductive layer via a through hole passing through the second insulation layer.

15. The display panel according to claim 10, wherein the first sub compensation unit comprises a plurality of first sub compensation units, and the first gate line comprises a plurality of first gate lines, the number of first sub compensation units connected by at least one gate line of the plurality of first gate lines differs from the number of first sub compensation units connected by other first gate lines of the plurality of first gate lines.

16. The display panel according to claim 1, wherein the display panel comprises a gate line layer, a first insulation layer, a source drain layer, a second insulation layer and a conductive layer that are sequentially stacked, the first gate lines and the second gate lines are formed in the gate line layer, and data lines are formed in the source drain layer, the compensation structure comprises a data line extension arranged in the source drain layer, the data line extension extends from the data line to the non-display area of the display panel, and orthographic projections of the data line extension and the second part arranged in the gate line layer on the substrate at least partially overlap.

17. The display panel according to claim 16, wherein a line width of the data line extension is greater than a line width of the data line.

18. A manufacturing method of a display panel for manufacturing a display panel as claimed in claim 1, the method comprising:

preparing a compensation structure, the compensation structure comprising a first electrode plate, orthographic projections of the first electrode plate and the second part on the substrate at least partially overlap.

19. A display device comprising the display panel as claimed in claim 1.

20. The display panel according to claim 9, wherein the display panel comprises a gate line layer, a first insulation layer, a source drain layer, a second insulation layer and a conductive layer that are sequentially stacked, the first gate lines and the second gate lines are formed in the gate line layer, and data lines are formed in the source drain layer, the compensation structure comprises a data line extension arranged in the source drain layer, the data line extension extends from the data line to the non-display area of the display panel, and orthographic projections of the data line extension and the second part arranged in the gate line layer on the substrate at least partially overlap.

* * * * *